US008910452B2

(12) United States Patent
Noturno

(10) Patent No.: US 8,910,452 B2
(45) Date of Patent: Dec. 16, 2014

(54) HURRICANE TIE FASTENER AND METHOD OF USE

(75) Inventor: Sam P. Noturno, Canton, OH (US)

(73) Assignee: Tallmadge Spinning & Metal Company, Akron, OH (US)

( * ) Notice: Subject to any disclaimer, the term of this patent is extended or adjusted under 35 U.S.C. 154(b) by 236 days.

(21) Appl. No.: 12/825,384

(22) Filed: Jun. 29, 2010

(65) Prior Publication Data

US 2011/0197522 A1    Aug. 18, 2011

Related U.S. Application Data

(60) Provisional application No. 61/276,030, filed on Feb. 16, 2010.

(51) Int. Cl.
| E04B 1/38 | (2006.01) |
| E04G 21/00 | (2006.01) |
| E04G 23/00 | (2006.01) |
| E04B 1/00 | (2006.01) |
| E04B 7/04 | (2006.01) |
| E04H 9/14 | (2006.01) |
| E04B 1/26 | (2006.01) |

(52) U.S. Cl.
CPC .............. E04B 1/2608 (2013.01); E04B 7/045 (2013.01); E04H 9/14 (2013.01)
USPC ......... 52/745.21; 52/93.2; 52/712; 52/745.19

(58) Field of Classification Search
CPC ... E04B 1/2604; E04B 1/2608; E04B 1/2612; E04B 7/045; E04H 9/14
USPC ............ 52/92.1, 92.2, 92.3, 93.1, 93.2, 52/698–704, 712, 714, 715, 741.1, 745.19, 52/745.21
See application file for complete search history.

(56) References Cited

U.S. PATENT DOCUMENTS

| 2,413,362 | A | * | 12/1946 | Maxwell et al. | 403/403 |
| 4,455,805 | A | * | 6/1984 | Rionda et al. | 52/712 |
| 4,714,372 | A | * | 12/1987 | Commins | 403/400 |
| 4,896,985 | A | * | 1/1990 | Commins | 403/11 |
| 4,932,173 | A | * | 6/1990 | Commins | 52/92.2 |
| 5,109,646 | A | * | 5/1992 | Colonias et al. | 52/712 |

(Continued)

OTHER PUBLICATIONS http://www.strongtie.com/products/connectors/h.asp, H Seismic and Hurricane Ties, Document Is Undated But the Document Was Printed From the Pertinent Website on Apr. 15, 2010.

*Primary Examiner* — Joshua J Michener
*Assistant Examiner* — Theodore Adamos
(74) *Attorney, Agent, or Firm* — Sand & Sebolt

(57) ABSTRACT

A hurricane tie fastener and method are provided for securing a truss to a wall structural member. The fastener includes upper and lower vertical perpendicular plates with respective nail-receiving through holes formed therein. A horizontal arm extends from adjacent the bottom of the upper plate away from the lower plate. A leg extends upwardly from the arm. A truss-receiving space is formed between the upper plate and leg having a top entrance opening for receiving the bottom of the truss when the fastener is moved upwardly relative to the truss. The fastener is self-supporting on the truss to make the nailing of the fastener to the truss and wall member easier and safer.

18 Claims, 11 Drawing Sheets

(56) References Cited

U.S. PATENT DOCUMENTS

| | | | |
|---|---|---|---|
| 5,335,469 A * | 8/1994 | Stuart | 52/655.1 |
| 5,732,524 A * | 3/1998 | Kalker et al. | 52/712 |
| 6,101,780 A | 8/2000 | Kreidt | |
| 6,301,855 B1 * | 10/2001 | Aerni | 52/702 |
| 6,490,840 B1 * | 12/2002 | Thompson | 52/715 |
| 6,655,096 B1 * | 12/2003 | Pryor | 52/92.2 |
| 6,662,517 B1 * | 12/2003 | Thompson | 52/714 |
| 6,763,634 B1 * | 7/2004 | Thompson | 52/92.2 |
| 6,877,284 B2 | 4/2005 | Thompson | |
| 7,178,305 B2 * | 2/2007 | Petrova | 52/715 |
| 7,254,919 B2 * | 8/2007 | Lutz et al. | 52/92.2 |
| 7,549,262 B2 * | 6/2009 | Roessett et al. | 52/746.11 |
| D618,085 S * | 6/2010 | Lin et al. | D8/354 |
| 8,051,620 B2 * | 11/2011 | Kittlitz et al. | 52/702 |
| 8,176,689 B1 * | 5/2012 | Thompson | 52/92.1 |
| 2002/0124483 A1 | 9/2002 | Rosas | |
| 2002/0189174 A1 * | 12/2002 | Thompson | 52/92.2 |
| 2003/0029124 A1 | 2/2003 | Wise | |
| 2006/0150564 A1 | 7/2006 | Dufault | |
| 2009/0178362 A1 | 7/2009 | Jerke | |

* cited by examiner

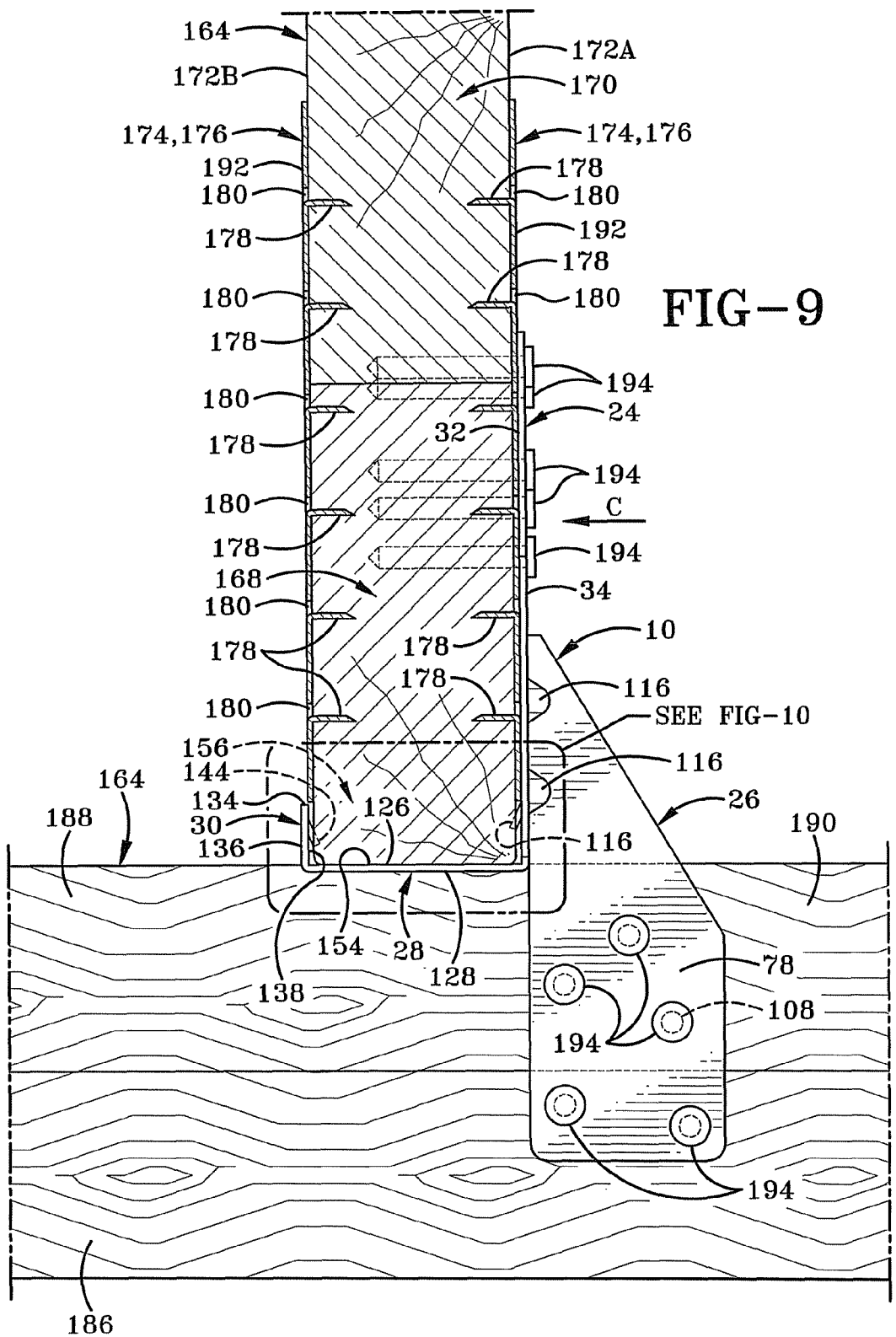

HURRICANE TIE FASTENER AND METHOD OF USE

CROSS REFERENCE TO RELATED APPLICATIONS

This application claims priority from U.S. Provisional Application Ser. No. 61/276,030 filed Feb. 16, 2010; the disclosure of which is incorporated herein by reference.

BACKGROUND OF THE INVENTION

1. Technical Field

The present invention is related generally to fasteners. More particularly, the invention is related to a fastener for securing two structural members to one another which are typically used in the framework of a house or other building. Specifically, the present invention is related to a fastener used to secure a truss to a wall structural member such as a wall stud.

2. Background Information

In the construction industry, it is common to use fasteners typically made of sheet metal for securing structural members to one another. In addition, there are various governmental standards or building codes which require certain structural members to be secured to one another in order to help guard against damage caused by seismic activity, hurricanes, tornados or other high velocity wind storms. One particular area of concern are the trusses used to support a roof. Fasteners are typically required to secure the truss to the wall stud or wall structural member to which the truss is mounted adjacent one of its ends.

One of the common fasteners in use for this purpose is shown in FIG. 1 and is manufactured and/or sold by the Simpson Strong-Tie Company Inc. under the name Simpson Strong-Tie®. This fastener has a very simple construction, and is formed of a single piece of sheet metal which is bent to form two flat vertical plates which are perpendicular to one another. The upper plate has holes formed therein through which nails are driven to secure the plate to a truss. The lower plate also has holes formed therein through which nails are driven to secure the fastener to the wall stud or other wall structural member. The two plates are joined at a vertical intersection. In essence, this fastener is essentially an angle iron formed from sheet metal with holes formed therein. Although this fastener works well for securing the truss to the wall, installation of the fastener has some drawbacks. These fasteners are invariably secured to the truss and wall stud either with a nail gun or the slower use of a hammer to pound the nails. In the former situation, particularly because the fastener is relatively small, the installer must hold the fastener in place with one hand just inches from the firing end of the nail gun, which the installer holds with the other hand. As will be readily appreciated, this presents a substantial potential danger to the hand holding the fastener. If a hammer is used, the installer must hold both the fastener and a nail in one hand while hammering with the other hand. This makes it difficult to properly position the fastener and is rather awkward as well. Thus, there is a need for an improved fastener for securing a truss to a structural wall member or stud.

BRIEF SUMMARY OF THE INVENTION

The present invention provides a hurricane tie fastener for use with a truss having a bottom, the fastener comprising an upper vertical plate which has a rear portion, first and second vertical parallel sides which extend forward from the rear portion and a bottom edge; a lower vertical plate which is perpendicular to the upper plate, which extends outwardly from adjacent the rear portion of the upper plate in a first direction so that the second vertical side generally faces the lower plate, and which has a bottom edge which is lower than the bottom edge of the upper plate; a first through hole formed in the upper plate; a second through hole formed in the lower plate lower than the bottom edge of the upper plate; a horizontal arm extending outwardly from adjacent the bottom of the upper plate in a second direction opposite the first direction; a leg extending upwardly from the arm; a truss-receiving space between the upper plate and the leg having a top entrance opening adapted to receive the bottom of the truss when the fastener is moved upwardly relative to the truss.

The present invention also provides a method comprising the steps of positioning a hurricane tie fastener at a non-securing position adjacent a first vertical surface of a wall structural member and a bottom of a truss which is mounted on the wall structural member and extends outwardly therefrom with first and second opposed vertical side surfaces extending upwardly from the bottom perpendicular to the first vertical surface; moving the fastener upwardly from the non-securing position to a securing position in which the bottom of the truss is received in a channel formed in the fastener, and so that first and second truss-engaging members engage the truss respectively along the first and second vertical side surfaces to hold the fastener to the truss in a self-supporting manner; nailing the fastener to the first vertical surface of the wall structural member in the securing position; and nailing the fastener to the first vertical side surface of the truss in the securing position.

The present invention further provides a method comprising the steps of stamping a flat piece of sheet metal into a configuration comprising an upper plate section having a bottom, a lower plate section which extends laterally outwardly from the upper plate section and downwardly beyond the bottom of the upper plate section, and a vertically elongated finger which has a first end secured to the bottom of the upper plate section and extends downwardly therefrom in cantilever fashion to a second end and so that the finger and lower plate section define therebetween a vertically elongated slot with a bottom entrance opening; bending the upper and lower plate sections relative to one another to form therebetween a vertical intersection from which the lower plate section extends outward in a first direction perpendicular to the upper plate section; bending the finger adjacent the first end so that a first portion of the finger forms a horizontal arm extending outwardly from adjacent the bottom of the upper plate section in a second direction opposite the first direction; bending the finger distal the first end so that a second portion of the finger forms a leg which extends upwardly from the arm and whereby the second end of the finger forms a top end of the leg; forming at least one first hole in the upper plate section; and forming at least one second hole in the lower plate section which is lower than the at least one first hole.

BRIEF DESCRIPTION OF THE SEVERAL VIEWS OF THE DRAWINGS

A preferred embodiment of the invention, illustrated of the best mode in which Applicant contemplates applying the principles, is set forth in the following description and is shown in the drawings and is particularly and distinctly pointed out and set forth in the appended claims.

FIG. 9 is a front elevational view of the fastener in its installed position.

Similar numbers refer to similar parts throughout the drawings.

DETAILED DESCRIPTION OF THE INVENTION

Figure 2:
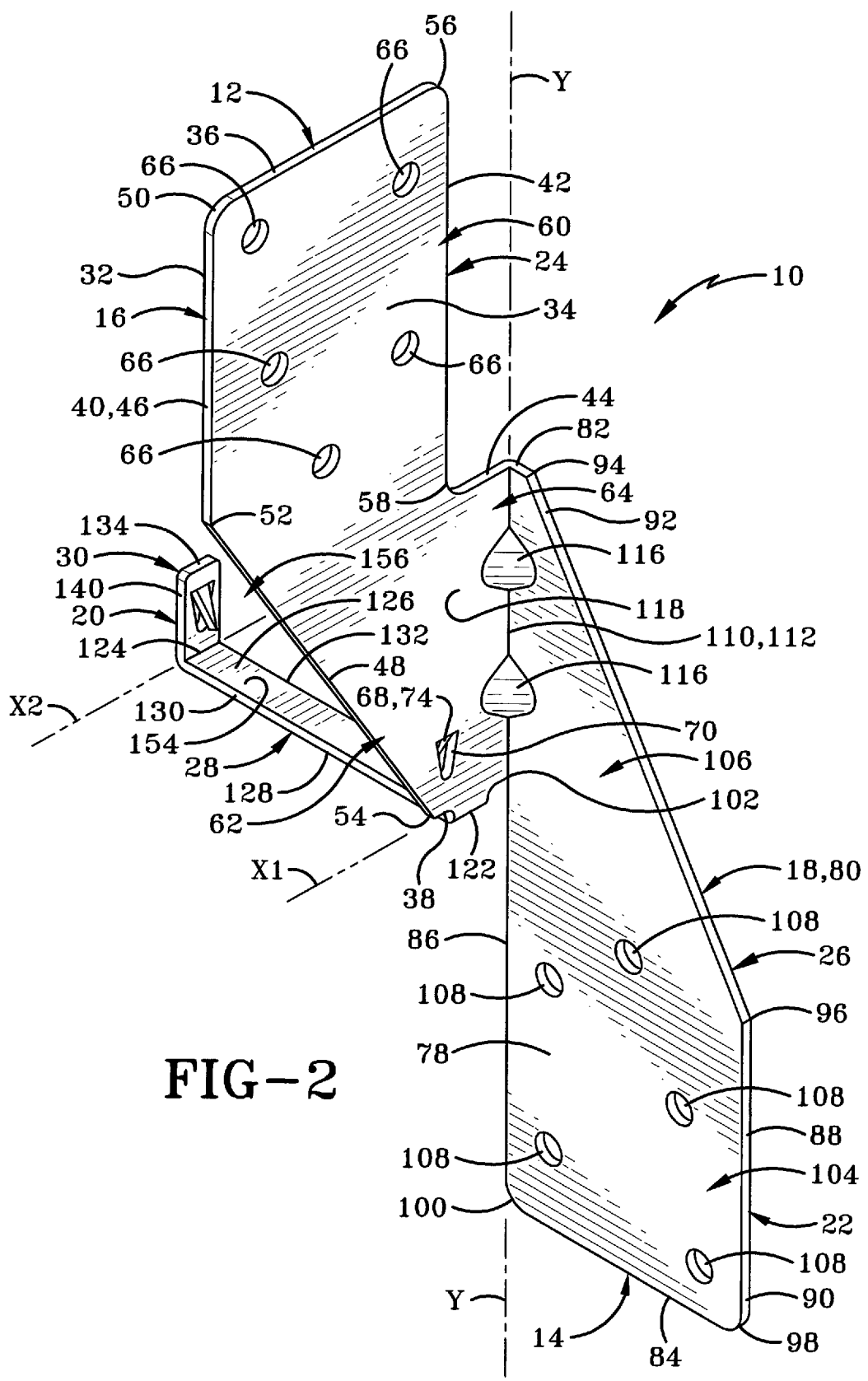
FIG. 2 is a perspective view of the hurricane tie fastener of the present invention as viewed from the front right and looking somewhat downwardly.

The fastener of the present invention is shown generally at 10 in FIG. 2. Fastener 10 in the exemplary embodiment is a unitary structure typically formed from a single piece of sheet metal which is bent and otherwise manipulated, as will be described further below. Fastener 10 is particularly configured for use in securing a truss to a wall structural member or stud. Fastener 10 has a top 12 and a bottom 14 defining therebetween a vertical or longitudinal direction, a front 16 and a back 18. Fastener 10 also has a first or left side 20 and second or right side 22 defining therebetween an axial direction. Fastener 10 includes a vertical first front upper plate 24, a vertical second lower back plate 26 which extends perpendicularly outwardly from plate 24 in a first direction, an arm 28 which extends perpendicularly outwardly from plate 24 in a second direction opposite the first direction, and a leg 30 which extends upwardly from arm 28.

Top plate 24 has a first or left vertical flat side 32 and an opposed second or right flat vertical side 34 parallel to side 32. Side 32 thus faces to the left and side 34 faces to the right so that sides 32 and 34 face away from one another. Plate 24 has a horizontal upwardly facing top edge 36 which defines top 12 and serves as the uppermost portion or surface of plate 24 and fastener 10. Plate 24 also includes a downwardly facing generally horizontal bottom edge 38, a forward facing front edge 40, a rearward facing vertical back edge 42, and an upwardly facing horizontal intermediate edge 44 which is spaced downwardly from top edge 36 and upwardly from bottom edge 38. Front edge 40 includes a vertical upper edge segment 46 and an angled lower edge segment 48. The front of top edge 36 and top of vertical edge segment 46 intersect one another at a convexly curved top front corner 50 which points or faces upwardly and forward. Vertical edge segment 46 extends down to a lower end which intersects the top of lower edge segment 48 at a convex corner or vertex 52 such that edge segments 46 and 48 define therebetween an obtuse angle. Lower edge segment 48 thus angles downward and rearwardly to a lower end which meets the front of bottom edge 38 at a convexly curved lower corner or vertex 54. The back end of top edge 36 intersects the top end of back edge 42 at a convexly curved corner 56 which points or faces upwardly and rearwardly. The lower end of back edge 42 intersects the front of intermediate edge 44 at a concavely curved corner 58 which faces upwardly and rearwardly.

Plate 24 thus includes an upper section 60 which is generally rectangular as viewed from the side and a lower section 62 which is generally triangular as viewed from the side and includes a rear or rearmost portion 64 of plate 24 which is rearward of back edge 42 and extends from bottom edge 38 to intermediate edge 44. In the exemplary embodiment, five circular nail-receiving through holes are formed in plate 24 in the upper section 60 thereof extending from first side 32 to second side 34. Each of holes 66 is at a different height and has a diameter typically on the order of about 5/32 inch plus or minus about 1/32 inch although this may vary. The two rearmost holes are vertically aligned with one another while the other three holes are spaced forward thereof and at different distances from the front vertical edge 40.

A tooth 68 is formed on upper plate 24 adjacent bottom edge 38. Tooth 68 in the exemplary embodiment is defined by a V-shaped slit 70 and has a triangular first or left side 72, a triangular second or right side 74 (as viewed from the side), and a sharp downwardly facing tip 76 extending from first side 72 to second side 74. In the exemplary embodiment, tooth 68 is formed by a stamping process such that tooth 68 adjacent its upper end is bent so that first side 72 extends outwardly to the left away from second side 34 of plate 24 beyond left vertical side 32 while second or right side 74 of tooth 68 extends inwardly from vertical side 34 to the left or generally towards leg 30. While tip 76 of tooth 68 is a sharp point in the exemplary embodiment, and the bottom of tooth 68 is narrower than the top of tooth 68 as viewed from the side, it may also be formed as a substantially square or rectangular tooth as viewed from the side with a horizontal tip. Alternately, a horizontally elongated ridge-like tooth may be formed which extends outwardly beyond vertical surface 32. The sharp tip 76 is generally preferred in that it provides an enhanced grip on the truss, as detailed further below.

Lower back plate 26 has a first or front flat vertical side 78 and defines the frontmost surface or portion of plate 26, and a second or back flat vertical side 80 which is parallel to side 78 and defines the rearmost surface or portion of plate 26 and fastener 10. Sides 78 and 80 are perpendicular to sides 32 and 34 of top plate 24. Plate 26 has a horizontal upwardly facing top edge 82 which serves as the uppermost surface or portion of plate 26 and is at the same height as and coincident with intermediate edge 44 of first plate 24. Bottom plate 26 has a horizontal downwardly facing bottom edge 84 which serves as the lowermost portion of lower plate 26 and fastener 10. Plate 26 also has a vertical first or left side edge 86 which extends downwardly from adjacent bottom edge 38 and one end of arm 28 and faces to the left generally toward arm 28 and leg 30. Edge 86 is parallel to sides 32 and 34 and in the exemplary embodiment is substantially coplanar with side 34. Edge 86 serves as the leftmost edge or portion of lower plate 26 whereby all or nearly all of plate 26 is disposed to the right or in the first direction beyond sides 32 and 34 of upper plate 24, as well as arm 28 and leg 30. Plate 26 has an opposed second or right side edge 88 which faces to the right away from first plate 24, arm 28, and leg 30. Side edge 88 includes a vertical lower edge segment 90 and an angled upper edge segment 92. Lower edge segment 90 serves as the rightmost edge or portion of lower plate 26 and thus the portion thereof which extends furthest from plate 24, arm 28 and leg 30 in the first direction. The right end of top edge 82 and the upper end of angled edge segment 92 intersect at a top corner or vertex 94 which is adjacent side 34 of first plate 24, is generally convex and points or faces upwardly and to the right away from first plate 24. Edge segment 92 angles from corner 94 downwardly and to the right or away from plate 24 so that its lower end intersects the upper end of vertical edge segment 90 at a convex corner or vertex 96 which points or angles upwardly and to the right generally away from arm 28 and leg 30. The lower end of vertical edge segment 90 intersects the right end of bottom edge 84 at a right bottom corner 98 which is convex and points or faces downwardly and to the right generally away from plate 24, arm 28, and leg 30. The left end of bottom edge 84 intersects the lower end of vertical edge 86 at a rounded convex corner or vertex 100 which points or faces downwardly and to the left away from the second side edge 88. The upper end of side edge 86 intersects bottom edge 38 of upper plate 24 at a concave corner 102 which faces generally downwardly and transitions into the back edge of arm 28.

Lower plate 26 thus has a lower section 104 which is generally rectangular and an upper section 106 which is generally triangular as viewed from the front. In the exemplary embodiment, five circular nail-receiving through holes 108 are formed in second plate 26 primarily in lower section 104 in a similar but inverted pattern relative to holes 66 in plate 24 and extend from front side 78 to back side 80. Holes 108 are lower than the bottom edge 38 of plate 24 and also lower than arm 28 and leg 30.

Upper section 106 of lower plate 26 is rigidly secured to lower section 62 of upper plate 24 along rearmost portion 64 thereof at a vertical right angle bend or intersection 110. Intersection 110 extends from top 82 of lower plate 26 to bottom 38 of upper plate 24 and the top of edge 86. Vertical intersection 110 lies along or has a vertical Axis Y which is at or adjacent the intersection of the two planes respectively defined by side 34 of upper plate 24 and front side 78 of lower plate 26. Intersection 110 has a concave inner front surface 112 which is arcuate as viewed from above and a convex outer back surface 114 which is also arcuate as viewed from above and generally parallels inner surface 112. Vertical side 34 of plate 24 and vertical front side 78 of lower plate 26 meet at vertical front surface 112 of intersection 110. Similarly, the vertical side 32 of upper plate 24 and back vertical side 80 of rear plate 26 meet at the outer back surface 114 of vertical intersection 110.

A pair of horizontal vertically spaced braces 116 interrupts intersection 110 and its front and back surfaces 112 and 114, breaking them into top, middle, and lower segments. Each brace 116 is generally horizontal and curved from top to bottom as viewed horizontally along a line intersecting each of surfaces 34 and 78 at a 45-degree angle. Top and bottom plates 24 and 26 together have a V-shaped configuration as viewed from above or below such that sides 34 and 78 define therebetween a V-shaped channel 118 as viewed from above or below. Sides 34 and 78 and inner surface 112 thus face channel 118 while sides 32 and 80 and outer surface 114 face away from channel 118. Braces 116 extend into channel 118 so that their convexly curved surfaces bound channel 118. Braces 116 have concavely curved surfaces which communicate with respective portions of outer surface 114 which are respectively above and below the given brace and also communicate with side 32 of first plate 24 and back side 80 of second plate 26. These concave surfaces of the braces 116 define respective concavities or indentations 120.

Horizontal arm 28 has a first end 122 which is rigidly secured to the bottom edge 38 of top plate 24 and extends horizontally therefrom in a cantilever fashion in a direction opposite bottom plate 26 to a second distal or terminal end 124 which is distal bottom edge 38. Numeral 122 also denotes a horizontal bend or intersection having a horizontal Axis X1 which is thus perpendicular to Axis Y and intersects or is adjacent Axis Y. The first end or bend 122 is also adjacent the bottom of vertical intersection 110, concave corner 102 and the top of edge 86. First end 122 is also in the exemplary embodiment directly below and adjacent tooth 68 and slit 70. Arm 28 has a flat horizontal upwardly facing top surface 126, a flat horizontal downwardly facing bottom surface 128, and front and back vertical edges 130 and 132 all of which extend from adjacent first end 122 to adjacent second end 124 and are horizontally elongated there between. Edges 130 and 132 extend from top surface 126 to bottom surface 128. Horizontal bend or intersection 124 is parallel to and at substantially the same height as bend 122 and thus has an Axis X2 which is parallel to and at substantially the same height as Axis X1 and spaced to the left.

Figure 3:
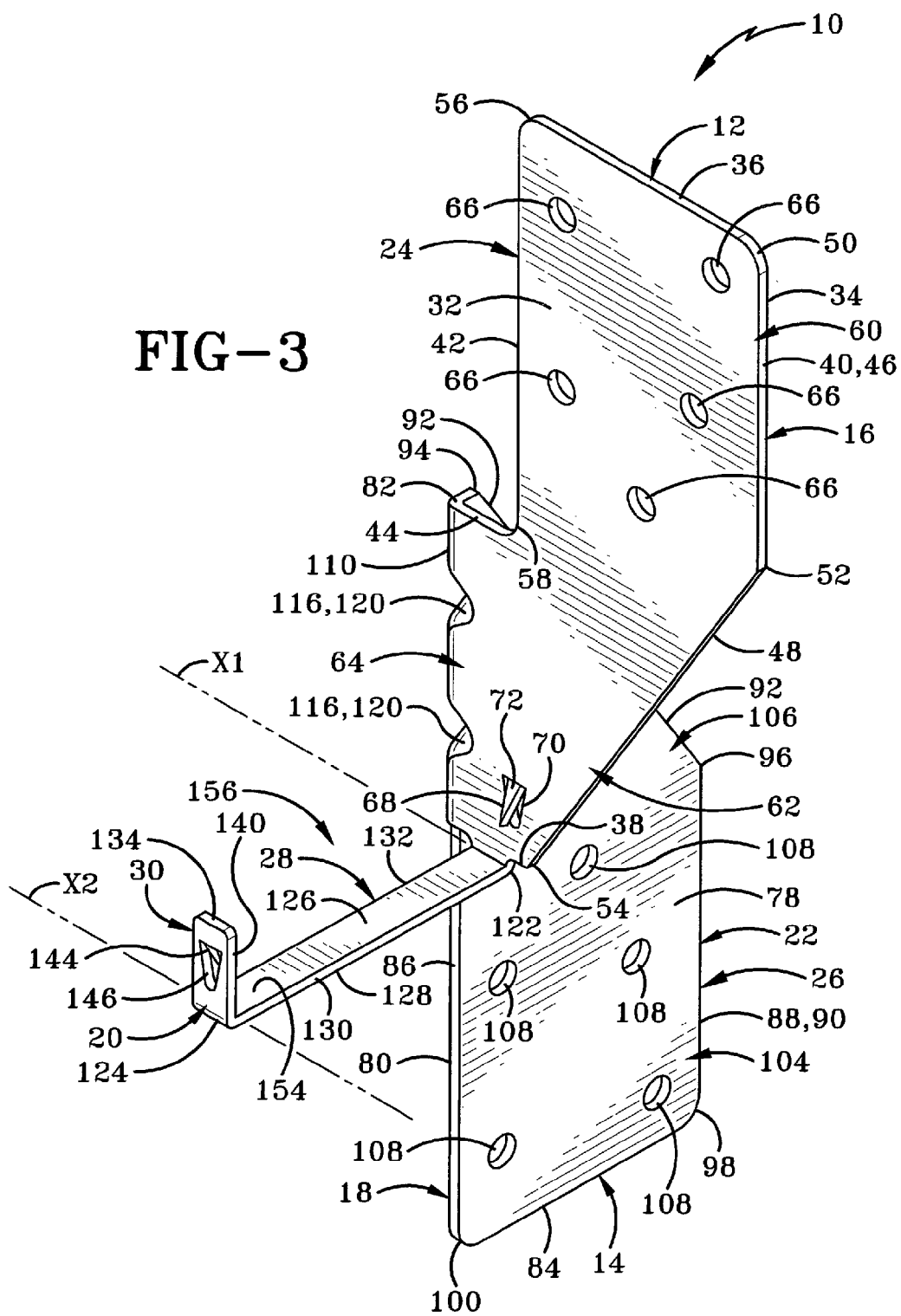
FIG. 3 is a perspective view of the fastener of FIG. 2 as viewed from the front left and looking somewhat downwardly.
Figure 4A:
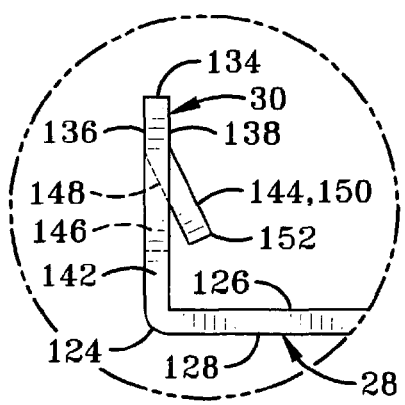
FIG. 4A is an enlarged front elevational view of the encircled portion of FIG. 4.
Figure 4:
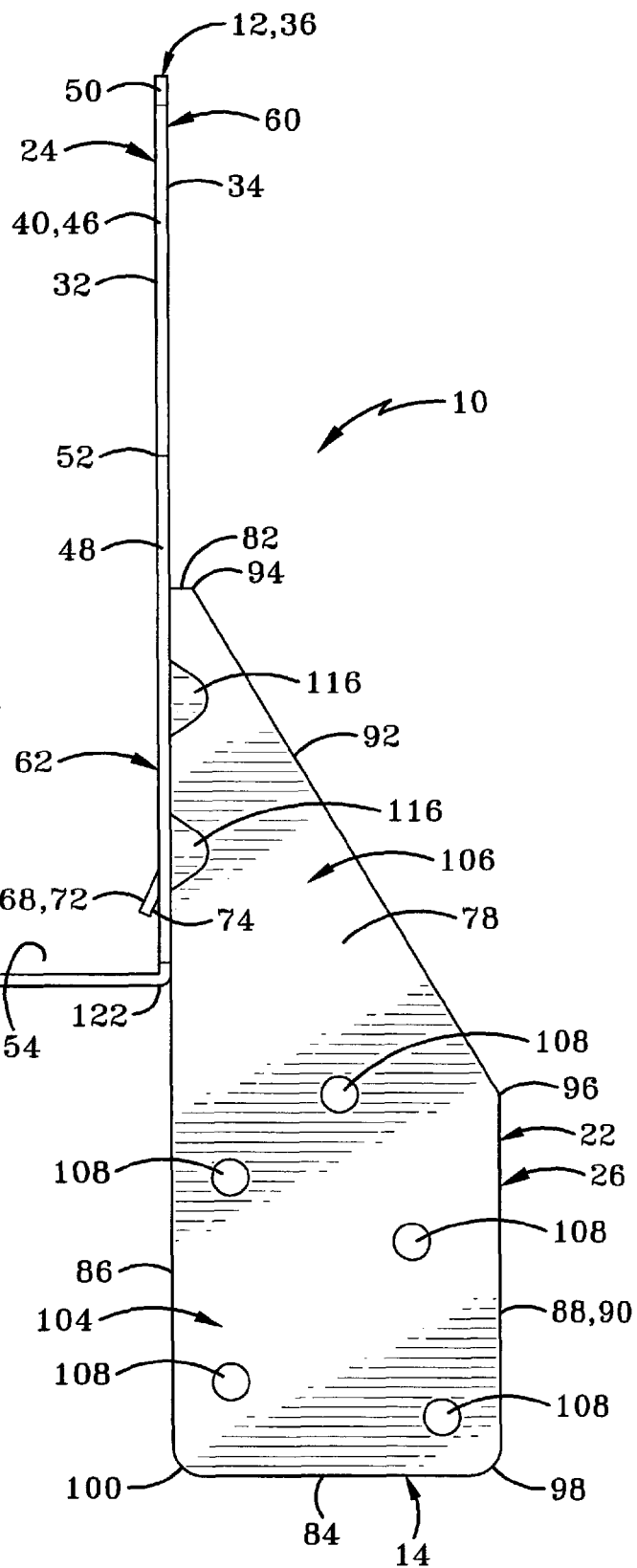
FIG. 4 is a front elevational view of the fastener of the present invention.
Figure 6:
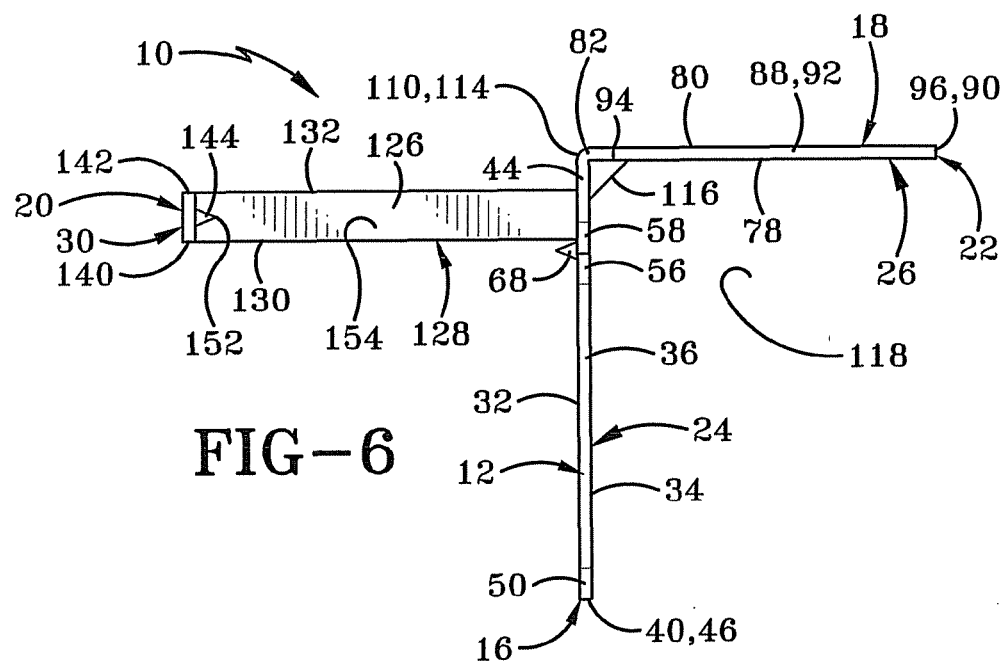
FIG. 6 is a top plan view of the fastener of the present invention.

Leg 30 has a lower end also denoted at 124 which is rigidly secured to and extends upwardly from second end 124 in a cantilever fashion to a terminal upwardly facing top end or edge 134. Leg 30 has a first or left side 136 (FIG. 4B) which faces away from first end 122 of arm 128 and plates 24 and 26. Leg 30 has a second or right opposed side 138 which in particular faces side 32 as well as more generally end 122 and plates 24 and 26. Although leg 30 is generally vertical and is shown as substantially vertical in the figures, it typically tapers upwardly and outwardly to a small degree away from vertical surface 32 of plate 24 to facilitate receiving the bottom of a truss when fastener 10 is moved upwardly around the bottom of the truss. Thus, first and second sides 136 and 138 are generally vertical and parallel to vertical side 32 of plate 24 although they typically taper upwardly and away from side 32 to a small degree. Leg 30 has vertical front and back edges 140 and 142 (FIG. 6) which extend from first side 136 to second side 138 and which are respectively continuous and coplanar with front and back edges 130 and 132. A tooth 144 (FIGS. 3, 4) is formed on leg 30 and defined by a V-shaped slit 146 extending from side 136 to side 138. Inasmuch as leg 30 has dimensions which are not all that much larger than tooth 144, tooth 144 is adjacent top 134, bottom 122, front and back edges 140 and 142, and left and right sides 136 and 138 of leg 30. Tooth 144 has a first or left side 148 (FIG. 4A) and second or right side 150 such that side 148 faces in a similar manner as side 136 and second side 150 faces in a similar manner as second side 138. Tooth 144 has a sharp bottom tip 152 which points downwardly. Similar to tooth 68, tooth 144 is bent a small degree adjacent its top end relative to leg 30 such that tip 152 projects beyond segment side 138 of leg 30 toward tooth 68 and first side 32 of plate 24. Thus, left side 148 of tooth 144 angles downwardly and inwardly relative to surface 136 while right side 150 also angles downwardly and to the right or towards the bottom edge 38 of plate 24 and end 122 of arm 28. Side 138 of leg 30 and the lower portion of vertical side 32 of plate 24 define therebetween a U-shaped channel 154 as viewed from the front. Channel 154 has a top entrance opening 156 through which the bottom of the truss enters channel 154 during upward movement of fastener 10 to mount fastener 10 thereon. Second side 150 and tip 152 of tooth 144 thus project beyond second side 138 of leg 30 into channel 154. Likewise, first side 72 and tip 76 of tooth 68 project beyond vertical side 32 of plate 24 into channel 154.

Figure 4B:
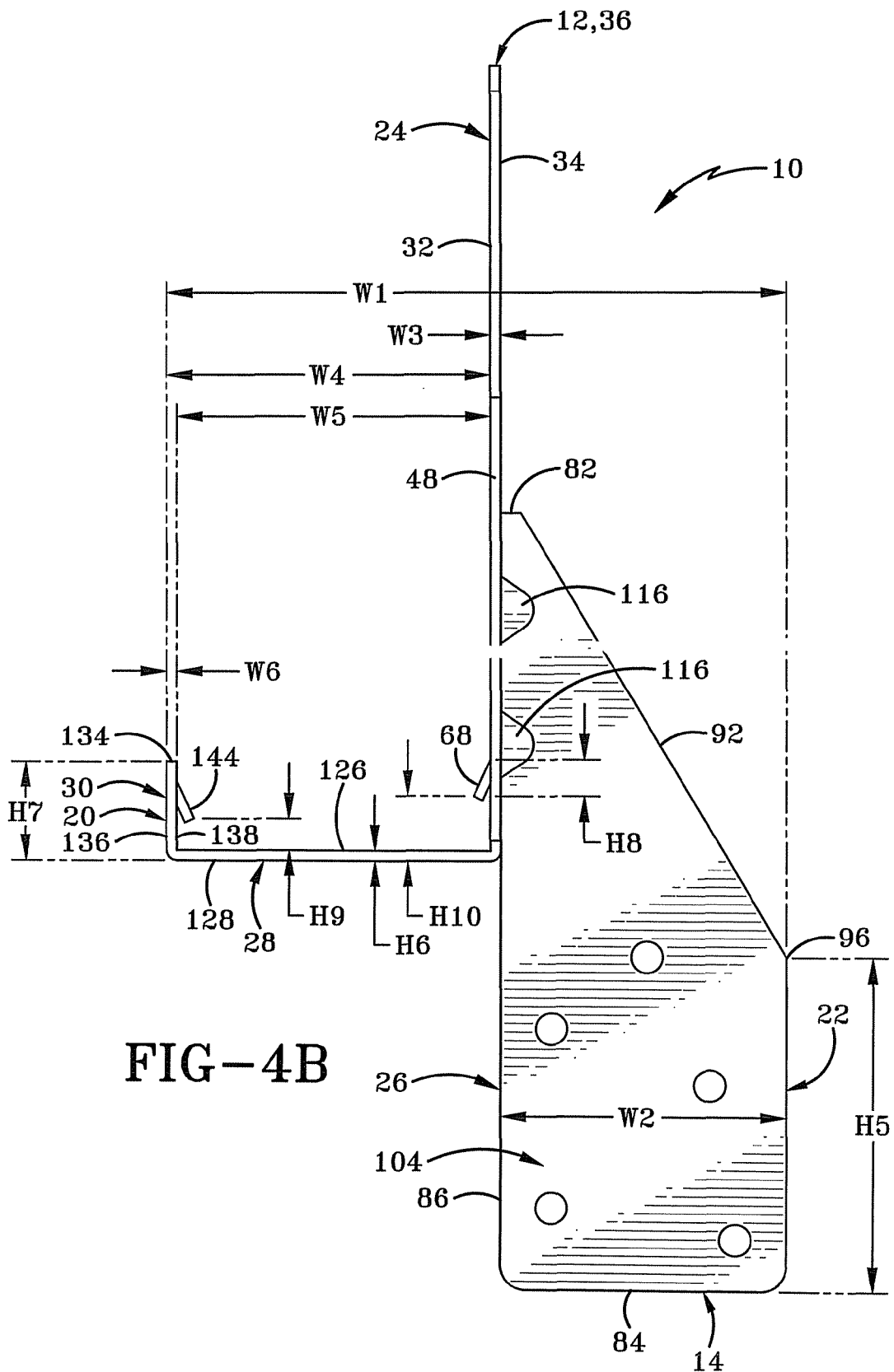
FIG. 4B is similar to FIG. 4 and illustrates various dimensions of the fastener.
Figure 5:
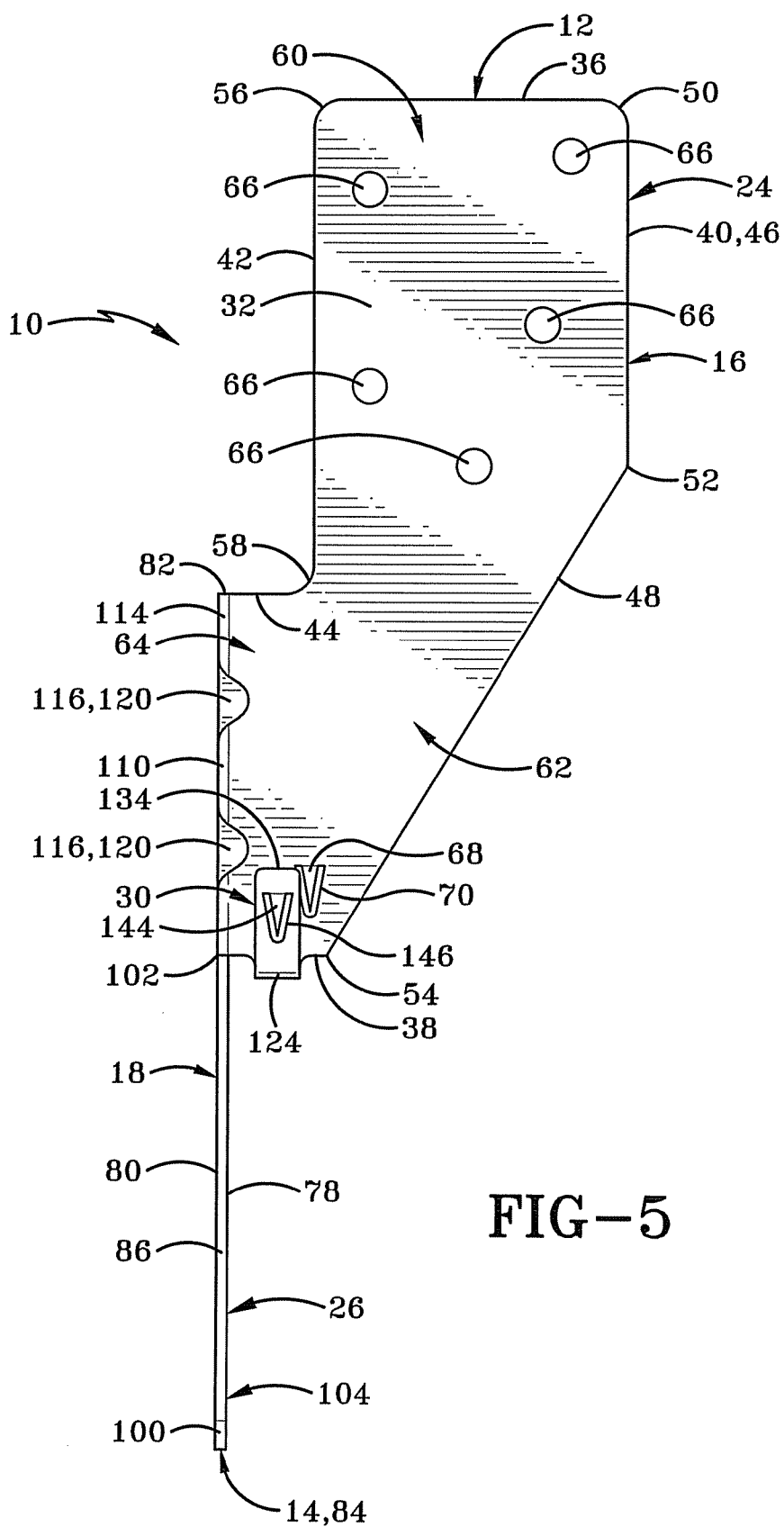
FIG. 5 is a left side elevational view of the fastener of the present invention.
Figure 5A:
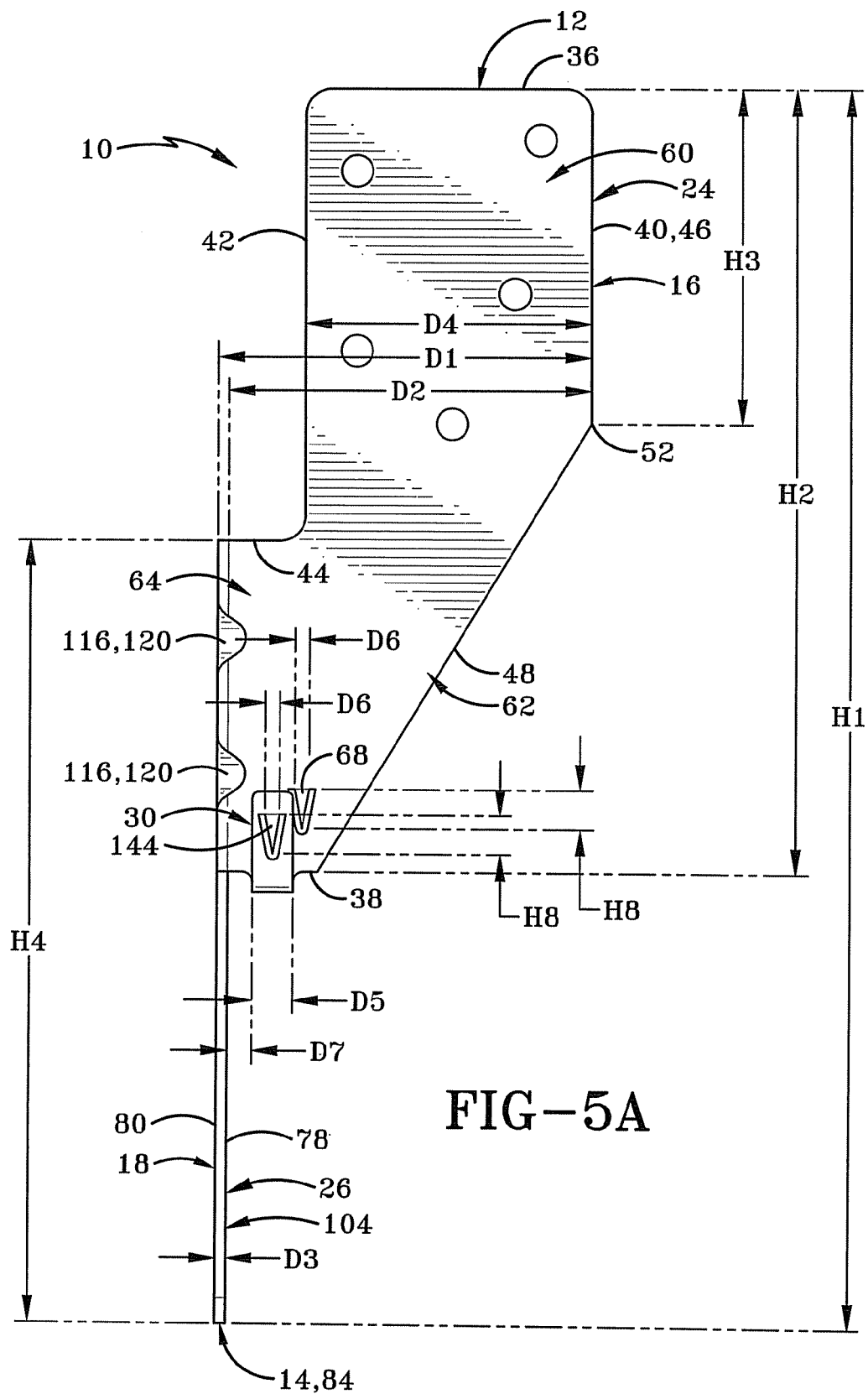
FIG. 5A is similar to FIG. 5 and shows several of the dimensions of the fastener.

Although the various dimensions of fastener 10 may vary, the dimensions of the exemplary embodiment are now provided with reference to FIGS. 4B and 5A. Top edge 36 and bottom edge 84 define therebetween a height H1 which is on the order of about 6 inches. Top edge 36 and bottom edge 38 define therebetween a height H2 of upper plate 24 which is about 3¾ inches. Top edge 36 and corner 52 define therebetween a height H3 of the upper section of plate 24 which is about 1.5 inches. Top edge 82 and bottom edge 84 define therebetween a height H4 of lower plate 26 which is about 3¾ inches and thus about the same as height H2. Bottom edge 84 and corner 96 define therebetween a height H5 of lower section 104 which is about 1.5 inches and thus about the same as height H3. Top surface 126 and bottom surface 128 of arm 28 define therebetween a height H6 of arm 28 which is the same as the thickness of the sheet metal from which fastener 10 is formed and is typically no more than about ¼ inch. Usually, the thickness or gauge of the sheet metal used to form fastener 10 is in the range of about 12 to 20 gauge and typically within the range of about 14 to 18 gauge although this may vary. Leg 30 has a height H7 which is defined between the top surface 126 of arm 28 and top edge 134 of leg 30. In the exemplary embodiment, height H7 is about ⅜ inch and is preferably not much more than this in order to avoid contact with the truss clip or truss gusset which secures the top and bottom cords of the truss to one another, as discussed further below. Tooth 68 and tooth 144 each have height H8 defined between the respective top of the tooth and the bottom tip of the tooth. Height H8 is typically about 5/32 inch. Tooth 144 is spaced upwardly from the top surface 126 of leg 28 so that tip 152 of tooth 144 and surface 126 define therebetween a distance or height H9 which is about ⅛ inch in the exemplary embodiment. Tooth 68 is also spaced upwardly from arm 28 such that its tip 76 and top surface 126 of arm 28 define therebetween a height H10 which is typically about ¼ inch.

The total width of fastener 10 is illustrated at width W1, which is defined between vertical edge segment 90 and first or left side 136 of leg 30 adjacent top edge 134 as measured horizontally. Lower plate 26 has a maximum horizontal width W2 defined between edge 86 and edge segment 90. Upper plate 24 has a horizontal width W3 defined between first and second sides 32 and 34, which is the same as the thickness of the sheet metal from which fastener 10 is formed, and thus the same as height H6 of arm 28. The combination of arm 28 and leg 30 have a horizontal width W4 defined between side 32 of upper plate 24 and first side 136 of leg 30 adjacent top edge 134. Width W4 is typically about 1⅝ inches. The truss receiving space or U-shaped channel 154 has a horizontal width W5 defined between side 32 of upper plate 24 and second side 138 of leg 30. width W5 is typically about 1½ inches. Leg 30 has a horizontal width W6 defined between first and second sides 136 and 138 thereof. Width W6 is the same as the thickness of the sheet metal from which fastener 10 is formed and thus is the same as width W3 and height H6. Each of teeth 68 and 144 also has a width defined between its first and second sides which is the same as width W6.

Fastener 10 has a total horizontal depth D1 defined between vertical edge segment 46 and back side 80 of lower plate 24. Depth D1 is the sum of the depth D2 of upper plate 24 and depth D3 of lower plate 26. Depth D2 is defined between vertical edge segment 46 of upper plate 26 and front side 78 of lower plate 26. Depth D3 is defined between front and rear sides 78 and 80 of lower plate 26 and is the same as the thickness of the sheet metal from which fastener 10 is formed whereby depth D3 is the same as width W3, width W6 and height H6. Upper section 60 of top plate 24 has a horizontal depth D4 defined between vertical edge segment 46 and back edge 42. Each of arm 28 and leg 30 has a horizontal depth D5 wherein depth D5 of arm 28 is defined between the front and back edges 130 and 132 thereof, and the depth D5 of leg 30 is defined between the front and back edges 140 and 142 thereof. Depth D5 is typically about 3/16 inch. Each of teeth 68 and 144 has a maximum width which is defined at the top or base portion of the respective tooth between the upper ends of the respective V-shaped slit 70 or 146. Depth D6 is typically about 3/32 inch. Thus, in the exemplary embodiment, depth D5 is only two times depth D6. Each of arm 28 and leg 30 is spaced forward from front side 78 of lower plate 24 a short distance such that front side 78 and either of back edge 132 of arm 28 or back edge 142 of leg 30 define therebetween a distance or depth of D7 which is typically about ⅛ to 3/16 inch. Depth D7 is thus about the same as depth D5 although it may be somewhat less or somewhat larger.

While the heights, widths and depths noted above may vary somewhat, it is clear that the ratio between some of these dimensions will fall within certain ranges. As noted above, height H2 and height H4 are typically about the same, as are height H3 and height H5, although these dimensions may certainly vary. While height H2 of upper plate 24 and height H7 of leg 30 may also vary, height H7 is clearly less than height H2 and typically far less. In the exemplary embodiment, height H7 is about 1/10 of height H2. Thus, height H7 is no more than ½ height H2, no more than ⅓ height H2 and so on, such that height H2 is no more than ¼, ⅕, ⅙, 1/7, ⅛ or 1/9 of height H2. Similar fractions or ratios may be calculated from the measurements given above with regard to the various heights, widths and depths of the components of fastener 10, which Applicant reserves the right to claim without specifying every detail within the Specification in order to prevent providing an overly lengthy and exhaustive list of such fractions or ratios.

Figure 7:
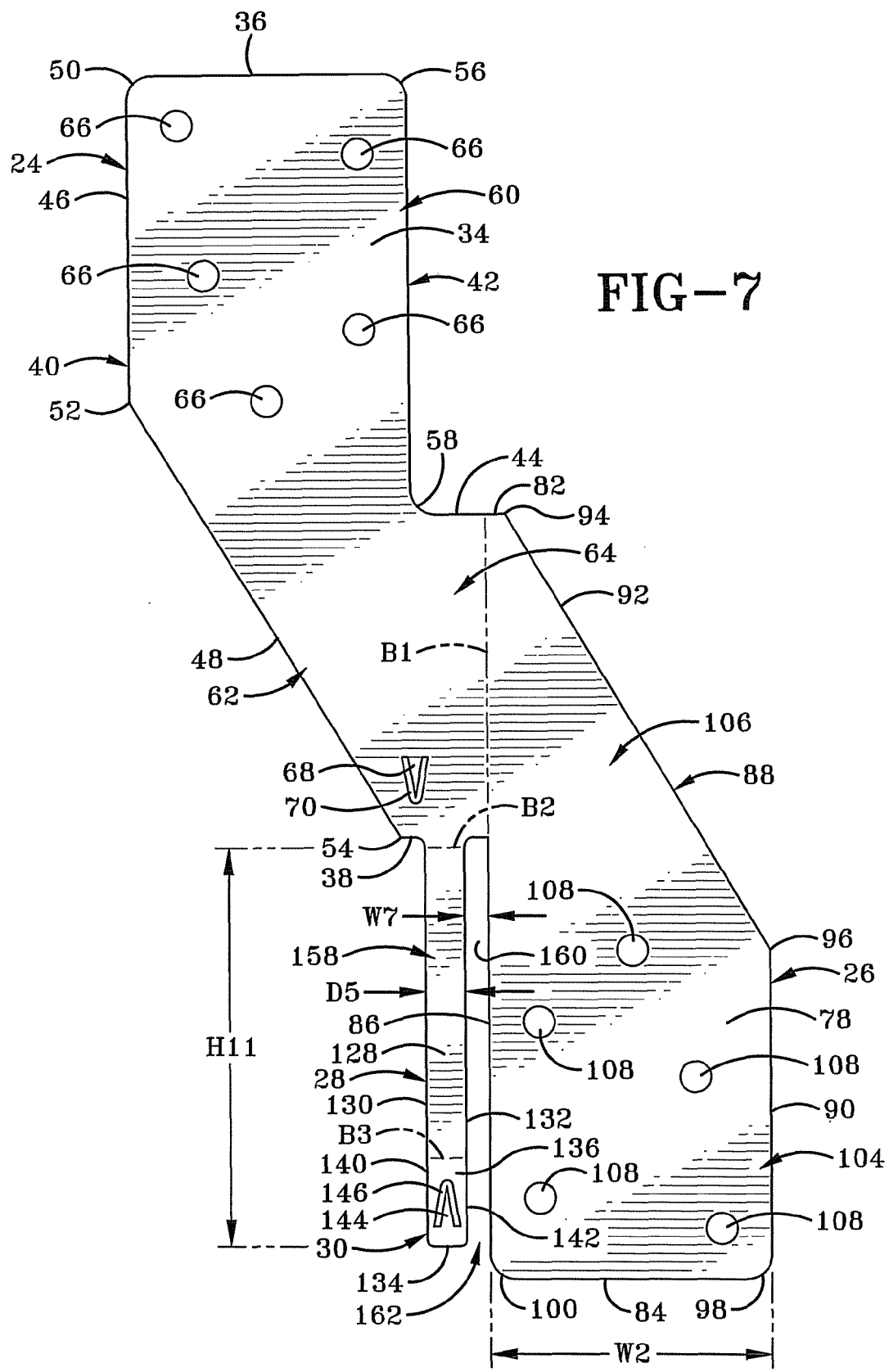
FIG. 7 is a front elevational view of a stamped piece of sheet metal showing the outline of the major components of the fastener prior to being bent into its final configuration.

A method of making the fastener of the present invention is now described. FIG. 7 shows an initial stage of the formation of fastener 10. A stamping machine or press will stamp a flat piece of sheet metal in order to create the smaller piece of flat sheet metal (shown in FIG. 7) having a configuration which includes an upper plate section which is represented at 24 in FIG. 7 and which ultimately becomes the upper plate 24 illustrated in the earlier figures. This stamping process also produces a lower plate section which is represented at 26 in FIG. 7 and which ultimately becomes the second or lower plate 26 illustrated in the earlier figures. This stamping process also produces a straight vertically elongated finger 158 which is secured to the bottom 38 of the upper plate section that extends vertically downwardly therefrom to a lower terminal end represented at 134 in FIG. 7. The stamping process thus also produces a straight vertically elongated slot 160 defined between finger 158 and the lower plate section 26. Slot 160 has a closed upper end defined by the bottom 38 of the upper plate section 24 and a bottom entrance opening 162. End 134 and entrance opening 162 are adjacent the lower end 84 of the lower plate section 26 at this stage. The stamping process also typically forms holes 66 and 108 as well as the V-shaped slits 70 and 146, thereby respectively defining teeth 68 and 144. At this stage, finger 158 is directly below the upper plate section 24 while tooth 144 is spaced substantially downwardly from tooth 68. Tooth 68 points downwardly while tooth 144 points upwardly. This stamping step may also bend the teeth 68 and 144 slightly rearwardly along their respective bases such that the respective tips of the teeth extend rearwardly a short distance from the backside of the upper plate section 24 and the finger 158. Thus, the configuration shown in FIG. 7 may be produced by a single stamping step. However, the holes of 66 and 108 may be formed in a separate stamping step or may, for example, be drilled. In addition, a separate stamping step may be used to form the V-shaped slits 70 and 146. A different step may also be used in order to bend teeth 68 and 44 if desired.

In the configuration shown in FIG. 7, each of finger 158 and slot 160 have a height H11 defined between lower end 134 or bottom entrance opening 162 and the upper end of the finger or slot, which is at or adjacent bottom 38 of upper plate 24. Height H11 is about the same as the total of height H7 (FIG. 4B) of leg 30 plus horizontal width W4 or horizontal width W5, whereby height H11 in the exemplary embodiment is typically on the order of about 1⅞-2 inches. The left and right edges of finger 158 define therebetween a horizontal width which is denoted at D5 in FIG. 7, and is thus the same as the depth D5 of arm 28 and leg 30, as illustrated in FIG. 5A. The vertical right edge 132, 142 of finger 158 and the left vertical edge 86 of lower plate 26 define therebetween a horizontal width W7 which is generally on about the same order as the width or depth D5 although it may be somewhat smaller or larger. Width W7 is typically in the range of about ⅛ to ¼ inch and is generally kept to a minimum in order to minimize the amount of scrap material left over after the stamping process. It is also noted that finger 158 is secured to the bottom 38 of plate 24 adjacent edge 86 of lower plate 26. Although upper plate 24 could be formed such that bottom 38 extended outwardly to the left substantially further than in the exemplary embodiment whereby finger 158 could also be spaced further away from lower plate 26, the configuration of the exemplary embodiment helps eliminate the production of scrap metal during the forming process and also allows arm 28 to be generally centrally located relative to the primary structures of fastener 10, namely near the vertical intersection between the upper and lower plates 24 and 26.

FIG. 7 illustrates in dashed lines the bend lines along which the stamped piece of sheet metal is bent in order to form the finished fastener 10. More particularly, the upper and lower plate sections 24 and 26 are bent about vertical bend line B1 in order to form vertical intersection or bend 110 with the lower plate section extending perpendicularly outward from the upper plate section in a first direction. It may also be said that the lower plate section 26 is bent along line B1 relative to the upper plate section and finger 158. Thus, if lower plate section 26 were held in a stationary position, the upper section 24 and finger 158 would move pivotally forward and to the right during the bending along line B1 relative to lower section 26. After the bending of the two plates to form vertical intersection 110, a sufficient force is applied by impact or pressing in the areas along the outer portion of intersection 110 in order form indentations 120 (FIGS. 3, 5) to form braces 116. Finger 158 is also bent along horizontal bend line B2 so that finger 158 extends perpendicularly in the opposite direction from the lower plate 26 so that the finger 158 is horizontal. The finger is then further bent distal the end or bend 122 along horizontal bend line B3 in order to form horizontal bend 124 so that the terminal end portion of finger 158 ultimately becomes leg 30 with the lowermost terminal end of finger 158 becoming the top or uppermost edge or end 134 of leg 30. In addition, the left edge 140 of the lower portion of finger 158 in the pre-bent configuration of FIG. 7 become the front edge 140 of leg 30 while the right edge 142 of the lower portion of finger 158 in the pre-bent configuration becomes the back edge of leg 30. Further, the portion of finger 158 between bent lines B2 and B3 becomes the horizontal arm 28 such that the left edge 130 of this portion of finger 158 becomes the front edge of arm 28 and the right edge 132 of this portion of finger 158 becomes the back edge of arm 28. In addition, the front and back surfaces of the lower portion of finger 158 respectively become the left and right sides or surfaces 136 and 138 of leg 30 while the front and back vertical surfaces of the portion of finger 158 between lines B2 and B3 respectively become the bottom and top surfaces 128 and 126 of arm 28. In the pre-bent configuration, vertical edge 132, 142 of finger 158 faces vertical edge 86 of the lower plate section 26 to define therebetween slot 160. Other relationships will be evident from the figures.

Figure 10:
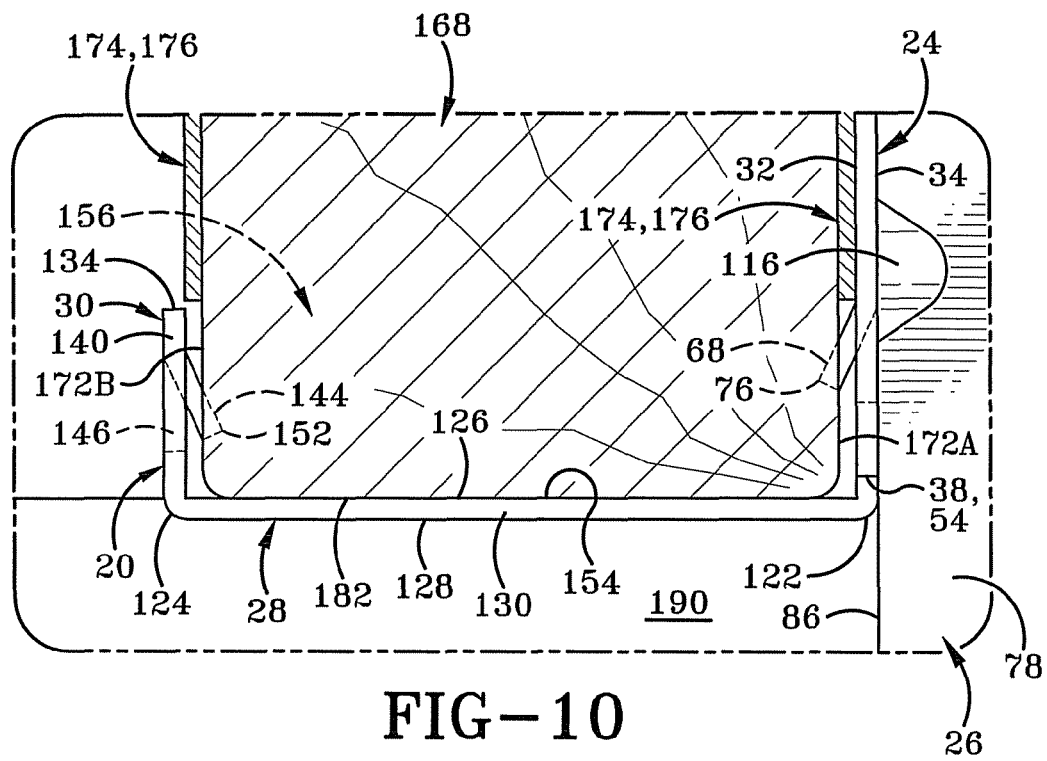
FIG. 10 is an enlarged front elevational view of the encircled portion of FIG. 9.
Figure 8:
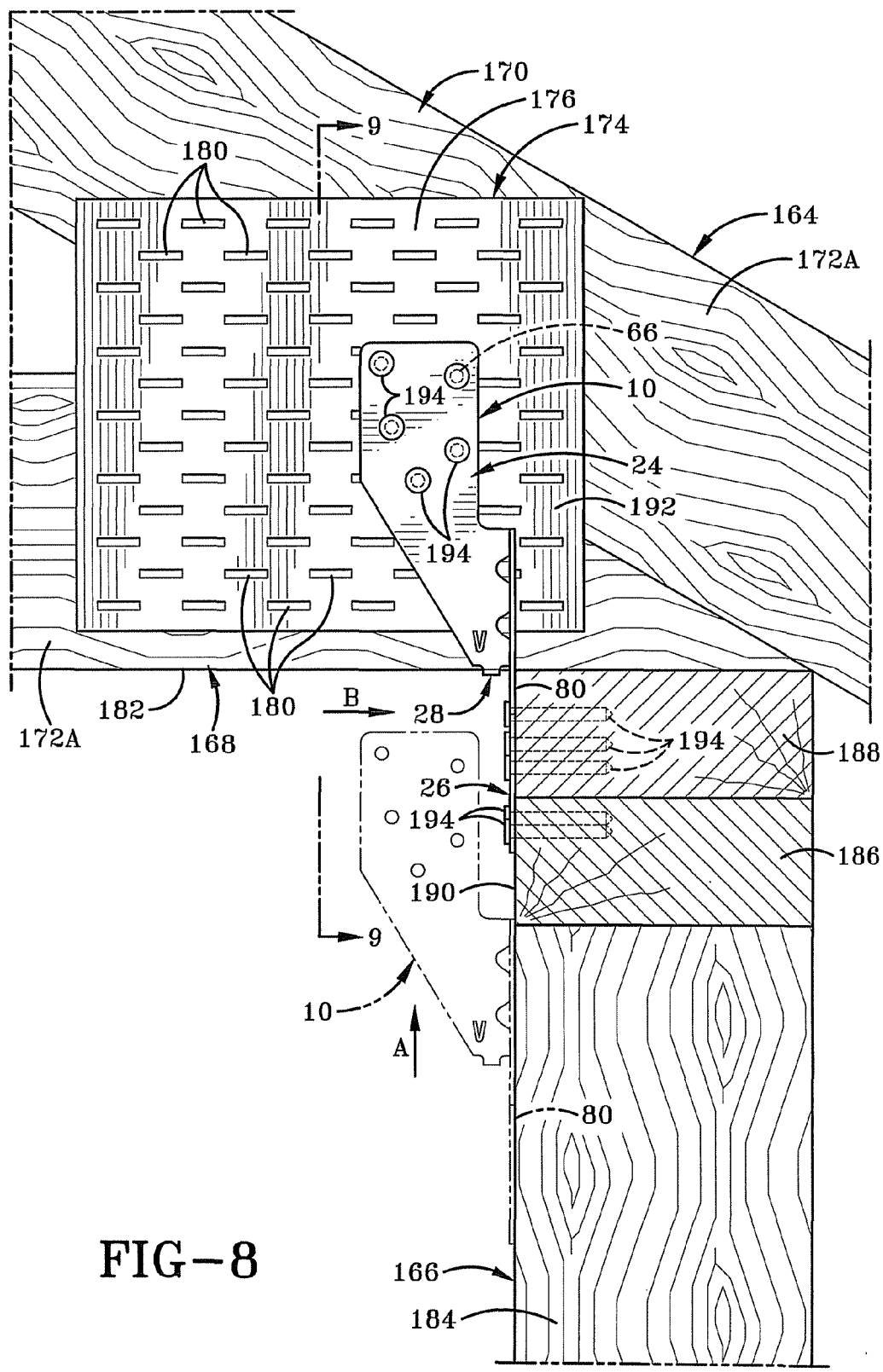
FIG. 8 is a right side elevational view of the fastener of the present invention and illustrates the method of installing the fastener to secure a truss to a wall stud.

The use or installation of fastener 10 is illustrated in FIGS. 8-10. Before describing this process, a brief description is first given of the structural members with which fastener 10 is used. FIG. 8 illustrates in part a portion of a truss 164 mounted atop a wall structural member 166. Truss 164 includes a horizontal lower chord and an angled upper chord 170 which is seated atop the outer end of lower chord 168 and angles upwardly therefrom toward a peak of the truss typically formed adjacent the peak of the roof. Truss 164 has opposed vertical side surfaces 172A and 172B. A pair of truss plates 174 secure the upper and lower chords to one another along the respective side surfaces 172 A and B. Each truss plate 174 includes a flat vertical plate 176 and multiple nail-like spikes 178 typically formed by stamping a piece of sheet metal such that spikes 178 are bent perpendicular and horizontally outwardly from plate 174 to leave behind respective elongated slots 180 which are through holes formed through plate 174. As is well known in the art, the spikes 178 of the respective truss plate 174 are forced into the typically wooden chords of the truss through the respective surface 172 so that the truss plates rigidly secure the upper and lower chords to one another. Lower chord 168 has a horizontal downwardly facing surface which serves as a bottom 182 of the truss. The wall to which the truss is to be secured typically includes a plurality of laterally spaced vertical wall studs 184 (only one shown) with one or more horizontal wall studs, such as lower and upper horizontal wall studs 186 and 188 seated atop the vertical wall studs 184 and secured thereto. Wall structural member 166 includes a vertical surface 190 which is perpendicular to bottom surface 182 as well as vertical side surfaces 172 of the truss.

FIG. 8 shows the fastener 10 in dashed lines in an uninstalled, unmounted or non-securing position while the solid lines show fastener 10 in an installed, mounted or securing position. In order to install fastener 10, the user will position fastener 10 at the non-securing position adjacent vertical surface 190 and below and adjacent the bottom 182 of the truss. This typically means that the back surface 80 of lower plate 26 is moved into position in contact with vertical surface 190 below the truss with channel 154 directly below the bottom 182 of lower chord 168. Fastener 10 is then moved upwardly to the installed or securing position.

This upward movement is typically a simple linear vertical motion (Arrow A) which involves a sliding engagement between back side 80 and vertical surface 190, as well as a sliding engagement between left side 32 of upper plate 24 and a vertical surface 192 of truss plate 174 which is parallel to surfaces 172.

During this upward movement of fastener 10, the bottom 182 of the truss is received through entrance opening 156 into channel 154 until the top 126 of horizontal arm 28 engages bottom 182 and thus stops or limits the upward movement of fastener 10. During this upward movement, leg 30 and the lower portion of upper plate 24 serve as truss-engaging members which slidably engage the truss respectively along the opposed vertical side surfaces 172 adjacent bottom 182. In the exemplary embodiment, these truss-engaging members include teeth 68 and 144, which not only slidably engage the vertical surfaces 172, but also dig into or scratch the surfaces 172 such that tips 76 and 152 are forced inwardly beyond the respective surfaces 172 in a barb-like fashion which makes it more difficult to remove fastener 10 downwardly thereafter. Although it is preferred that the truss-engaging members include teeth such as teeth 68 and 144, fastener 10 may be formed such that width W5 (FIG. 4B) of channel 154 is slightly smaller than the width of the truss in order that the bottom of the truss is wedged into channel 154 along vertical surfaces or the like other than teeth 68 and 144. In any case, the truss-engaging members are sufficient to grip the side surfaces 172 such that the bottom of the truss is wedged therebetween in a manner which allows fastener 10 to be self-supporting in the secured position. In other words, the engagement between fastener 10 along leg 30 and along the lower portion of upper plate 24 entirely supports fastener 10 on the truss so that the installer is free to use both hands for the remainder of the installation, which involves nailing the fastener 10 to the wall structural member 166 and truss 174 via a plurality of nails 194.

Arrow B in FIG. 8 represents a hammer or nail gun for installing the nails 194 respectively through lower plate 26 via respective holes 108, as well as the force applied to the nails and the movement of the nails from an unsecured to a secured position. Similarly, Arrow C in FIG. 9 represents a hammer or nail gun used to install nails 194 through top plate 24 via respective holes 66, as well as the force end horizontal movement of the nails from an unsecured to secured position. The nailing of fastener 10 via the various nails 194 completes the installation of the given fastener 10, which thus secures the truss 174 to the wall structural member 166.

Figure 1:
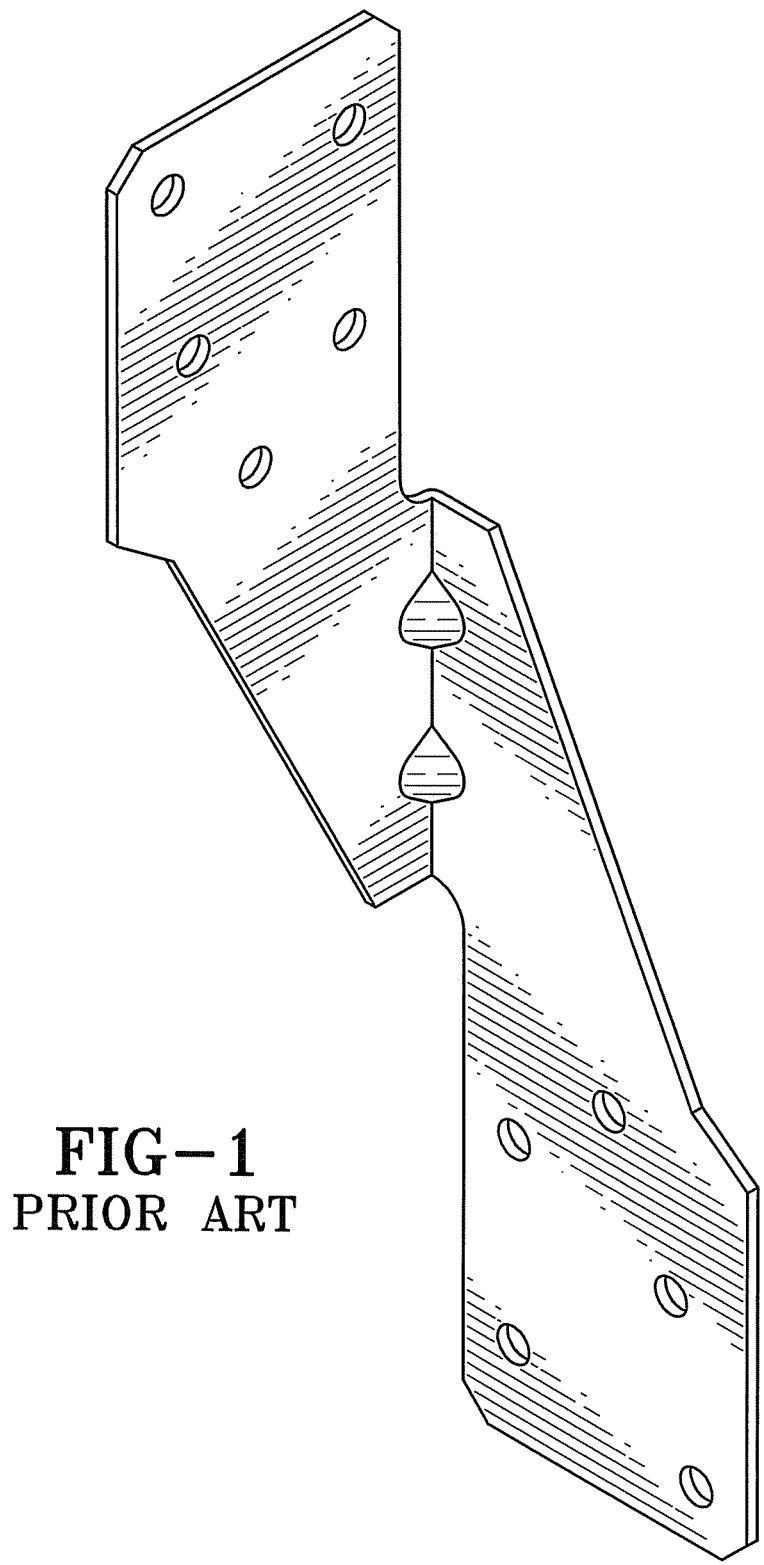
FIG. 1 is a perspective view of a prior art fastener.

As previously noted, horizontal arm 28 abuts the bottom 182 of a truss in order to stop the upward movement of fastener 10 prior to the installation of nails 194. Not only does arm 28 serve as a stop which limits the upward movement of fastener 10 relative to the truss, it also serves as a positioning member which properly positions fastener 10 in the securing position prior to the nailing process. Conveniently, this self-positioning aspect provided by arm 28 eliminates one of the problems with the prior art clip shown in FIG. 1. More particularly, leg 28 positions fastener 10 during the installation process so that no portion of the upper plate 24 extends downwardly lower than bottom 182 of the truss. In using the prior art fastener shown in FIG. 1, it is easy for the installer to accidentally position the prior art fastener improperly so that a portion of the upper plate does extend downwardly lower than the bottom of the truss a sufficient distance to become an obstacle to installing sheetrock or other wall panels during the finishing of the wall. In other words, if the upper plate 24 extends downwardly far enough below the bottom of the truss, it will interfere with positioning the top of the wall panel. In order to properly install the wall panel, the prior art fastener would either have to be repositioned or the wall panel would have to be modified. Repositioning the prior art fastener is clearly a hassle and relatively time consuming. As a result, installers often will resort to cutting or breaking the sheetrock or other wall panels along the top in order to provide a place for the interfering portion of the prior art fastener to be received such that the wall panel may be installed. This process is also relatively time consuming and adds to the risk of damaging the wall panel beyond the ability to be used.

As shown in FIGS. 9 and 10, when fastener 10 is in the securing position, leg 30, including the tooth 144, are out of contact with the truss plate 174 which extends along the same side 172B of the truss. In the exemplary embodiment, leg 30 is thus sufficiently short so that its uppermost end 134 is lower than the bottom or lowermost portion of the corresponding plate 176 of truss plate 174. Thus, the relatively minimum height H7 (FIG. 4B) of leg 30 is typically intended to keep leg 30 out of contact with the truss plate while also minimizing the amount of material used in order to provide the truss-engaging function noted above. In the exemplary embodiment, tooth 68 is also sufficiently low enough to engage the truss along surface 172A below the corresponding truss plate 174.

It is noted that the present Specification has provided several instances of negative limitations although this has not been done exhaustively. For instance, it was previously indicated that leg 28 positions fastener 10 during the installation so that no portion of the upper plate extends downwardly lower than bottom 182 of the truss. Similarly, it may be said that only lower plate 26 and arm 28 extend lower than bottom 182 when fastener 10 is installed, or that only lower plate 26 extends lower than the bottom of arm 28, or that no portion forward of the front surface of lower plate 26 extends lower than the bottom surface of leg 28. This Specification has also previously identified certain surfaces or edges which, for example, serve as the uppermost, lowermost or frontmost portions of the fastener or of a given component. This description also was not exhaustive. Thus, for instance, front edge 130 may also be described as the frontmost edge or portion of leg 28 while rear edge 132 may also be described as the rearmost edge or portion of leg 28. Similarly, the Specification is not exhaustive in specifying every distinction such as leg 30 extends horizontally the furthest from upper plate 24 in a direction opposite from the direction in which lower plate 26 extends from upper plate 24. Similarly, the Specification is not exhaustive in its description of specifying that fastener 10 is free of components extending outwardly from various edges or surfaces in various directions. However, Applicant reserves the right to claim these types of limitations which are evident from the figures if necessary to define over any prior art references of which the Applicant is currently unaware. This may include the ability to claim, for instance, that fastener 10 is free of a vertical or horizontal flat wall or plate extending forward from front surface 78 of lower plate 26 or rearwardly from rear surface 80 of lower plate 26.

The fastener 10 of the present invention and its method of use thus facilitate the positioning of the fastener for joining a truss to a wall structural member as well as substantially enhancing the safety of the installer. Fastener 10 also provides these improvements at a low cost while using only a minimum amount of material in order to provide the positioning and self-supporting structure previously described.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of the invention is an example and the invention is not limited to the exact details shown or described.

What is claimed is:

1. A method comprising the steps of:
    positioning a hurricane tie fastener at a non-securing position adjacent a first vertical surface of a wall structural member and a bottom of a truss which is mounted on the wall structural member and extends outwardly therefrom with first and second opposed vertical side surfaces extending upwardly from the bottom perpendicular to the first vertical surface;
    while the truss is seated atop the wall structural member, moving the fastener upwardly relative to the truss and wall structural member from the non-securing position to a securing position in which the bottom of the truss is received in a channel formed in the fastener and so that first and second truss-engaging members engage the truss respectively along the first and second vertical side surfaces to hold the fastener to the truss in a self-supporting manner such that engagement between the truss-engaging a members and the truss along the first and second vertical side surfaces entirely supports the fastener on the truss;

nailing the fastener to the first vertical surface of the wall structural member in the securing position; and nailing the fastener to the first vertical side surface of the truss in the securing position;

wherein one of the truss-engaging members comprises a first tooth which extends into the channel; and during the step of moving the fastener upwardly, the first tooth digs into one of the first and second vertical side surfaces.

2. The method of claim 1 wherein the fastener is asymmetrical about any plane passing through the fastener.

3. The method of claim 1 wherein the wall structural member has a top; and neither of the truss-engaging members is directly above the top of the wall structural member after the steps of nailing the fastener to the first vertical surface of the wall structural member and to the first vertical side surface of the truss.

4. The method of claim 1 wherein the other of the truss-engaging members comprises a second tooth which extends into the channel; and during the step of moving the fastener upwardly, the second tooth digs into the other of the first and second vertical side surfaces.

5. The method of claim 1 wherein the fastener comprises:

an upper vertical plate which has a rear portion, first and second vertical parallel sides which extend forward from the rear portion and a bottom edge;

a lower vertical plate which is perpendicular to the upper plate, which extends outwardly from adjacent the rear portion of the upper plate in a first direction so that the second vertical side generally faces the lower plate, and which has a bottom edge which is lower than the bottom edge of the upper plate;

a first through hole formed in the upper plate;

a second through hole formed in the lower plate lower than the bottom edge of the upper plate;

a horizontal arm extending outwardly from adjacent the bottom of the upper plate in a second direction opposite the first direction; and a leg extending upwardly from the arm; and wherein the channel is between the upper plate and the leg and has a top entrance opening which receives the bottom of the truss during the step of moving the fastener upwardly.

6. The method of claim 1 The method of claim 5 wherein the lower plate has a vertical edge which extends downwardly from adjacent the bottom edge of the upper plate.

7. The method of claim 5 wherein the first and second vertical sides of the upper plate define therebetween a horizontal thickness; and the arm has top and bottom surfaces defining therebetween a height which is the same as the thickness.

8. The method of claim 5 wherein the arm has front and back edges defining therebetween a width; and the arm has top and bottom surfaces defining therebetween a height which is less than the width.

9. The method of claim 5 wherein the arm has top and bottom surfaces defining therebetween a height which is no more than ¼ inch.

10. The method of claim 5 wherein the arm is secured to the upper plate adjacent the bottom edge at a first horizontal bend which is perpendicular to the lower plate.

11. The method of claim 5 wherein the lower plate has a front vertical side; and the arm has a back edge which is forward of the front vertical side.

12. The method of claim 5 wherein the leg is secured to the arm at a horizontal bend which is perpendicular to the lower plate.

13. The method of claim 5 wherein the lower plate has a front vertical side; and the leg has a back edge which is forward of the front vertical side.

14. The method of claim 5 wherein the arm and leg have respective front edges which are coplanar.

15. The method of claim 5 wherein the upper plate has a top edge; the top and bottom edges of the upper plate define therebetween a first height; the leg has a top and a bottom defining therebetween a second height which is no more than half of the first height.

16. The method of claim 5 wherein the leg is free of nail-receiving holes formed therein.

17. The method of claim 5 wherein the fastener is free of structure which extends outwardly beyond the leg in the second direction.

18. The method of claim 5 wherein the fastener is free of a vertical plate which is parallel to the upper vertical plate and secured to the lower plate.

\* \* \* \* \*

UNITED STATES PATENT AND TRADEMARK OFFICE
CERTIFICATE OF CORRECTION

PATENT NO. : 8,910,452 B2
APPLICATION NO. : 12/825384
DATED : December 16, 2014
INVENTOR(S) : Sam P. Noturno Page 1 of 1

It is certified that error appears in the above-identified patent and that said Letters Patent is hereby corrected as shown below:

In the Claims

Column 13, line 6 (Claim 1) change "engaging a members" to --engaging members--

Column 14, line 5 (Claim 6) change "The method of claim 1 The method of claim 5" to --The method of claim 5--

Signed and Sealed this
Seventh Day of April, 2015

Michelle K. Lee
*Director of the United States Patent and Trademark Office*